Nov. 10, 1964  S. J. PETRELLA ETAL  3,156,276
PARING TOOL FOR FLESHY VEGETABLES
Filed Feb. 21, 1962

Sebastiano J. Petrella
Salvatore J. Petrella
INVENTORS

BY *[signature]*
Attorneys

United States Patent Office 3,156,276
Patented Nov. 10, 1964

3,156,276
PARING TOOL FOR FLESHY VEGETABLES
Sebastiano J. Petrella, 11-A Golden Ave., and Salvatore J. Petrella, 18 Wright Ave., both of Medford, Mass.
Filed Feb. 21, 1962, Ser. No. 174,824
3 Claims. (Cl. 146—43)

This invention comprises a novel and useful paring tool for fleshy vegetables and more particularly pertains to a power operated vegetable peeler especially adapted for peeling the skin of different varieties of squash and the like.

The primary object of this invention is to provide a paring tool which may be power driven and which will expeditiously and efficiently effect the paring of the skins of vegetables such as squash and the like while the vegetable is held in the hand of the user and placed against the tool during rotation of the latter.

A further object of the invention is to provide a paring tool in accordance with the foregoing object which shall be so constructed that the same will be self-cleaning by centrifugally discharging peelings removed from the vegetable by the cutting edges of the tool.

A still further object of the invention is to provide a tool in accordance with the foregoing objects which shall be capable of effecting a smooth pared surface upon a vegetable when held thereagainst.

Still another object of the invention is to provide a power operated paring tool in accordance with the preceding objects which shall be relatively safe to handle by the elimination of any cutting edges or sharp projecting surfaces at the opposite ends of the tool to thereby avoid injury of a person placing his hand against the rotating end of the tool.

A further important object of the invention is to provide a paring tool in compliance with the preceding objects which shall have the radius of the cutting edges from their axis of rotation and the widths of the channels in the tool which form the cutting edges so proportioned with regard to the speed of rotation that centrifugal force will be effective to discharge peelings from within the channels to thus maintain the tool in a clean condition during use of the latter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
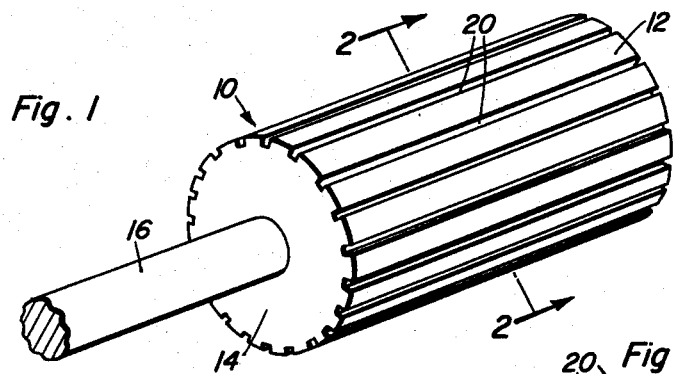
FIGURE 1 is a perspective view of one embodiment of a paring tool in accordance with this invention a part of the drive shaft thereof being broken away.
Figure 2:
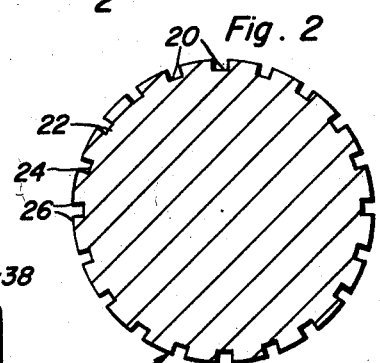
FIGURE 2 is a vertical transverse sectional view taken substantially upon the plane indicated by section line 2—2 of FIGURE 1 and showing the cross sectional configuration and the contours of the cutting elements of the tool.

Referring first to the embodiment of FIGURES 1 and 2 it will be observed that the paring tool forming the subject matter of this invention is designated generally by the numeral 10 and consists of a solid body having a circumferential surface 12 thereabout and a pair of annular flat planar end surfaces one of which is shown at 14 and which end surfaces are perpendicular to the axis of rotation. The tool further includes an axially projecting shaft 16 which through any suitable agency, not shown, has power applied thereto and thus effects rotation of the tool. It is further intended, although this feature is not absolutely necessary, that the shaft 16 shall be suitably journaled and shall itself comprise the entire supporting means for the body of the tool 10.

It will be appreciated that the tool will be constructed in any suitable length, and that rotation will be imparted to the shaft 16 and thus to the body of the tool by any conventional power operating means, not shown, such as those used in conventional household power operated kitchen appliances.

In the embodiment shown in FIGURES 1 and 2 the body of the tool is cylindrical being of substantially uniform diameter from end to end thereof and having its circumferential surface 12 preferably smoothly and highly polished. This surface is broken, however, by a plurality of longitudinally extending channels 20 which are disposed in side-by-side relation at equal distances from each other about the circumference of the body. These channels, as shown in FIGURE 2 preferably comprise slots or troughs having a substantially flat bottom wall 22 therein together with flat planar side walls 24 which extend from the bottom wall outwardly to the circumference of the body. An important feature of the invention resides in forming the pair of side walls within each channel 20 at an inclination to each other with respect to the extent of the side walls from the bottom walls of the channels to the periphery of the body which is not less than 180°. Generally, it is preferred to form these side walls parallel, although they may be outwardly divergent within the scope of this invention. The purpose of this construction is to facilitate the free flow of peelings which may accumulate in the channels 20 during the operation of the tool so that under the effect of centrifugal force they will be readily thrown out of the channels thus maintaining the channels clean.

It will be understood that the outlet or peripheral edges of the side walls 24 of the channels provide peeling or cutting edges 26 which will peel or pare the skin from fleshy vegetables such as squash or the like when the vegetable is pressed against the circumferential surface of the rotating tool.

As shown in this embodiment of the invention, the channels 20 extend the full length of the circumferential surface of the body and open through the annular end faces 14 thereof.

In the preferred form of the invention indicated generally by the numeral 30 of FIGURE 3, there is again provided a rotor comprising a solid body 32 of an elongated nature and from at least one end of which axially extends a shaft 34 constituting the means by which the body is supported and by which it is rotated. It will be understood that this shaft 34 is connected to any suitable power source such as that previously mentioned in connection with the embodiment of FIGURES 1 and 2, and this shaft may also constitute the support means for mounting the body for rotation.

In this form of the invention, however, there are two significant differences from the arrangement of the preceding form. Thus, the circumferential surface of the body is concave from end to end thereof. The body thus has a diametrically reduced minimum diameter at its mid portion as shown at 36 and gradually curves with increasing diameter to its end portions as at 38. Further, the longitudinally extending grooves 40 upon the body although likewise being disposed in side-by-side relation and each lying in a radial plane with these radial planes being equidistantly spaced circumferentially of the body about the axis of rotation as was the case with the preceding embodiment, terminate at their ends inwardly of the corresponding end surfaces or ends of the body. As a result of this construction, at each end of the body there is provided a smoothly curving circular rim or ring 42 which is free of any sharp breaks in its surface and which as was the case with the rest of the body of FIGURE 1 is of a smooth highly polished nature. Consequently, it is safe for the user to contact or touch the rim 42 since there are no cutting edges thereon. As will be appreciated, in the manual placing of vegetables against the rotating body to peel the vegetables, it is frequently almost unavoidable to contact the surface of the body, particularly when small vegetables are being peeled by the body. This may be done in perfect safety with this form of the invention.

Figure 3:
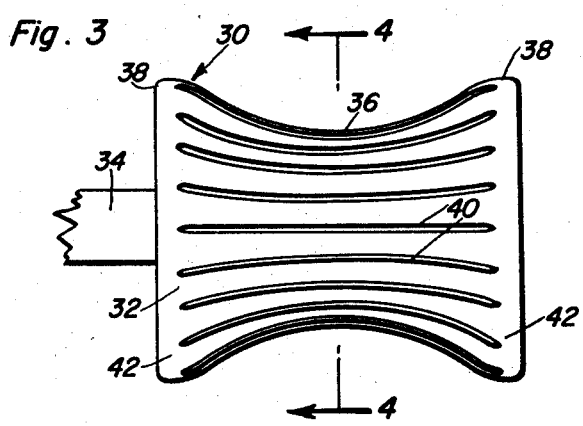
FIGURE 3 is a perspective view similar to FIGURE 1 but showing the preferred embodiment of the tool.
Figure 4:
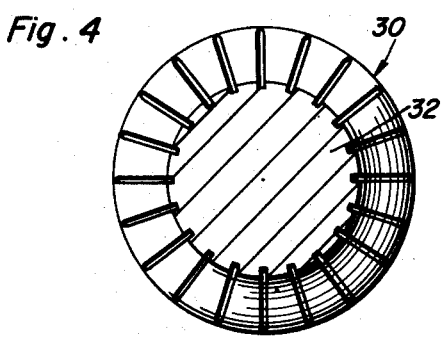
FIGURE 4 is a vertical transverse sectional view taken substantially upon the plane indicated by the section line 4—4 of FIGURE 3.

In both forms of the invention it will be seen that the circumferential surface of the body is generated by an elongated element which is rotated about an axis at a fixed distance therefrom. In the case of the embodiment of FIGURES 1 and 2, this element was a straight line thereby generating a cylinder by its rotation. In the case of FIGURE 3, however, the element consisting of a line which from its midpoint curves progressively outwardly from the axis of rotation towards its opposite extremities. Thus there is proivded a centrally dish-shaped body.

A further important difference in the device of FIGURE 3 over that of FIGURE 1 is that owing to the curvature of the body from its mid portion to its extremities, the actual linear spacing between adjacent grooves will vary from a minimum at the central portion of the body to a maximum at the extremities of the body. As a result of this characteristic for this type of body, it is evident that by holding the vegetable to be peeled at different places along the body, the different peeling effects may be produced thereon. Thus, a relatively small or close bite may be taken from the skin of the vegetable when the latter is held adjacent the mid portion of the body, while a relatively bigger bite or segment is removed from the skin when the vegetable is held near the ends of the body. This results in the possibility of greater facility peeling the vegetables and in greater control of the peeling action thereon.

Moreover, in this form of the invention centrifugal force will be at a maximum at the extremities of the channels. However, centrifugal force owing to the curvature of the channels will also tend to move any peelings in the moisture which is produced on them by the peeling action axially of the body within the channels 40 towards the ends thereof, and at these ends centrifugal force will be effective to throw the peelings therefrom.

In both forms of the invention it is an important feature that the entire circumferential surface of the body, that is, the surface between the channels 20 of the form of FIGURE 1 and the channels 40 of the form of FIGURE 3 shall be smooth, highly polished and of a uniform radius from the axis of rotation at each longitudinally spaced position on the body. Further, it is an important feature that the side walls of the channels of either form shall be either parallel to each other or shall diverge slightly outwardly from the inner to the outer edges of these side walls so as to facilitate the centrifugal cleaning action of the body. Further, it is a very important feature of the invention that the distance of these channel side walls from the axis of rotation, the spacing of the side walls of each channel from each other and the angular relationship of the side walls of a channel with respect to each other shall be so proportioned to the speed of rotation of the body as to automatically produce sufficient centrifugal force to effect centrifugal cleaning of peelings from the channels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-cleaning vegetable peeling tool comprising an elongated solid concave body of circular transverse section, a shaft projecting axially from at least one end of said body and comprising means for rotating said body about an axis of rotation, said body having smooth flat, planar annular end surfaces each lying in a plane normal to said axis of rotation, the circumferential surface of said body being smooth and having spaced, longitudinally extending channels therein of uniform width from end to end, said channels having planar side walls and a bottom wall, the circumferential edges of said side walls being sharp and comprising peeling edges when a vegetable is held against the circumferential surface of said body when the latter is rotating, the diameter of the body and the depth and width of said channels and the inclination of said side walls being such that for a given speed of rotation centrifugal force will clean vegetable peelings from said channels, said channels being divergent from their intermediate portions to their ends for varying the peeling effects of the different longitudinal points, said channels terminating in said circumferential surface of said body inwardly of said end surfaces whereby to provide an annular smooth unbroken surface at the end portions of said circumferential surface.

2. The combination of claim 1 wherein said circumferential surface is generated by an element which is smoothly curved from its mid-portion radially outwardly to its ends relative to said axis.

3. A self-cleaning vegetable peeling tool comprising an elongated concave body circular in transverse section from end to end, a shaft integral with and projecting axially from at least one end of said body, said body having smooth flat, planar end surfaces each lying in a plane normal to said axis of rotation, the cirrcumferential surface of said body having longitudinally extending channels therein of uniform width from end to end, said channels having planar side walls and an intervening bottom wall, the circumferential edges of said side walls comprising peeling edges, the diameter of the body and the depth and width of said channels and the inclination of said side walls being such that for a given speed of rotation centrifugal force will clean vegetable peelings from said channels, said channels being divergent from their intermediate portions to their ends for varying the peeling effects of the different longitudinal points, said channels terminating within said circumferential surface inwardly of said end surfaces whereby to provide an uninterruptedly smooth unbroken surface at each end portion of said circumferential surface.

References Cited in the file of this patent

UNITED STATES PATENTS

| 846,666 | Hanson | Mar. 12, 1907 |
|---|---|---|
| 1,277,770 | Thiele | Sept. 3, 1918 |
| 1,758,675 | Reilly | May 13, 1930 |
| 2,085,225 | Lucks | June 29, 1937 |
| 2,664,591 | Brophy | Jan. 5, 1954 |
| 3,026,612 | Szczepanski | Mar. 27, 1962 |